(12) United States Patent
Shida

(10) Patent No.: US 10,466,815 B2
(45) Date of Patent: Nov. 5, 2019

(54) DISPLAY SYSTEM

(71) Applicant: RICOH COMPANY, Ltd., Ohta-ku (JP)

(72) Inventor: Haruo Shida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 64 days.

(21) Appl. No.: 15/917,971

(22) Filed: Mar. 12, 2018

(65) Prior Publication Data
US 2018/0267635 A1 Sep. 20, 2018

(30) Foreign Application Priority Data

Mar. 16, 2017 (JP) .................. 2017-051946

(51) Int. Cl.
| | |
|---|---|
| G06F 3/0354 | (2013.01) |
| G06F 1/16 | (2006.01) |
| G06F 3/038 | (2013.01) |
| G06F 3/041 | (2006.01) |

(52) U.S. Cl.
CPC ........ G06F 3/03545 (2013.01); G06F 1/1626 (2013.01); G06F 3/038 (2013.01); G06F 3/0383 (2013.01); G06F 3/0412 (2013.01); G06F 2200/1632 (2013.01)

(58) Field of Classification Search
CPC ...................... G06F 3/03545; G06F 2200/1632
See application file for complete search history.

(56) References Cited

U.S. PATENT DOCUMENTS

| | | | | |
|---|---|---|---|---|
| 9,507,381 | B1 * | 11/2016 | Vanderet | G06F 1/1656 |
| 9,632,594 | B2 * | 4/2017 | Hicks | G06F 3/03545 |
| 2002/0190823 | A1 | 12/2002 | Yap | |

(Continued)

FOREIGN PATENT DOCUMENTS

| | | |
|---|---|---|
| JP | 59-014041 | 1/1984 |
| JP | 2937150 | 6/1999 |

(Continued)

OTHER PUBLICATIONS

U.S. Appl. No. 11/635,220, filed Dec. 6, 2006.
U.S. Appl. No. 15/024,577, filed Sep. 4, 2014.

*Primary Examiner* — Sepehr Azari
(74) *Attorney, Agent, or Firm* — Xsensus LLP

(57) ABSTRACT

A display system includes a pointing device and a display device. The pointing device includes: a magnetic member; a contact detector configured to detect contact with a user; a motion detector configured to detect a motion of the pointing device; and a transmitter configured to transmit state information to the display device in response to a state determining unit determining that contact detection information indicating detection of the contact is acquired from the contact detector and a value indicating the motion is less than a reference value. The display device includes: an electromagnet; a status determining unit configured to determine an energization status of the electromagnet; a receiver configured to receive the state information; and an electromagnet controller configured to control energization to the electromagnet in accordance with the energization status of the electromagnet when the state information is received.

6 Claims, 4 Drawing Sheets

(56) References Cited

U.S. PATENT DOCUMENTS

| | | | |
|---|---|---|---|
| 2007/0103455 A1* | 5/2007 | Omata | G06F 1/1626 |
| | | | 345/179 |
| 2007/0115491 A1 | 5/2007 | Kato et al. | |
| 2008/0077919 A1 | 3/2008 | Shida et al. | |
| 2008/0134027 A1 | 6/2008 | Saeki et al. | |
| 2009/0144934 A1 | 6/2009 | Kitagawa et al. | |
| 2011/0285671 A1* | 11/2011 | Wu | G06F 3/0487 |
| | | | 345/179 |
| 2012/0002231 A1 | 1/2012 | Nagahara et al. | |
| 2013/0002964 A1 | 1/2013 | Kodaira | |
| 2013/0106723 A1* | 5/2013 | Bakken | G06F 3/03545 |
| | | | 345/173 |
| 2013/0135262 A1* | 5/2013 | Alameh | G06F 3/0383 |
| | | | 345/179 |
| 2014/0049911 A1* | 2/2014 | Corbin | A45C 13/002 |
| | | | 361/679.58 |
| 2014/0180481 A1* | 6/2014 | Park | G06F 3/0487 |
| | | | 700/275 |
| 2015/0156290 A1* | 6/2015 | Amit | H04M 1/026 |
| | | | 345/179 |
| 2016/0109968 A1* | 4/2016 | Roh | G06F 3/03545 |
| | | | 345/173 |
| 2017/0048370 A1* | 2/2017 | Kim | H04M 1/7253 |
| 2018/0053588 A1* | 2/2018 | Barel | H01F 7/0252 |
| 2018/0059817 A1* | 3/2018 | Pirie | G06F 3/03545 |

FOREIGN PATENT DOCUMENTS

| | | |
|---|---|---|
| JP | 2003-058312 | 2/2003 |
| JP | 2009-145927 | 7/2009 |
| JP | 2012-063844 | 3/2012 |
| JP | 5100864 | 10/2012 |

\* cited by examiner

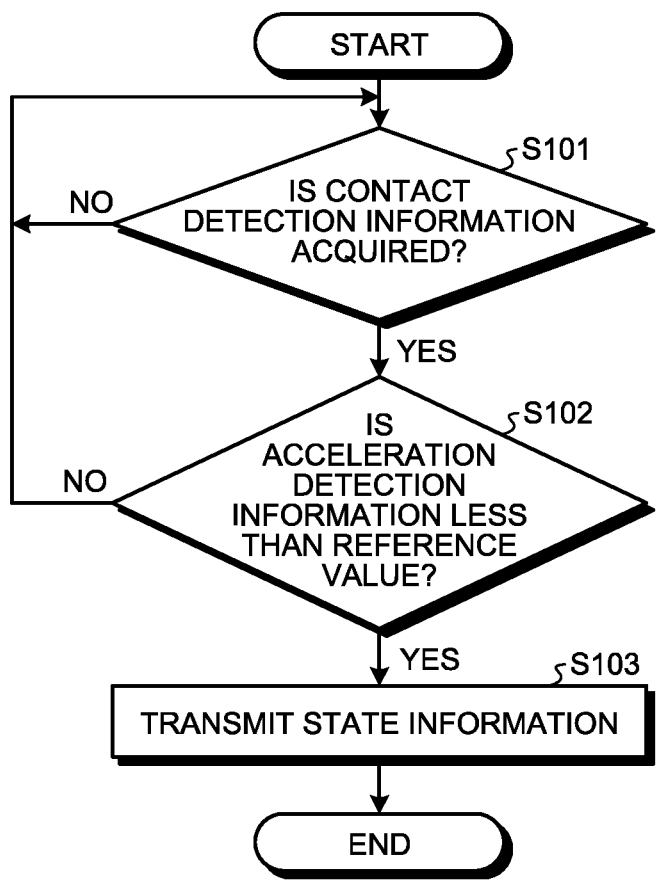

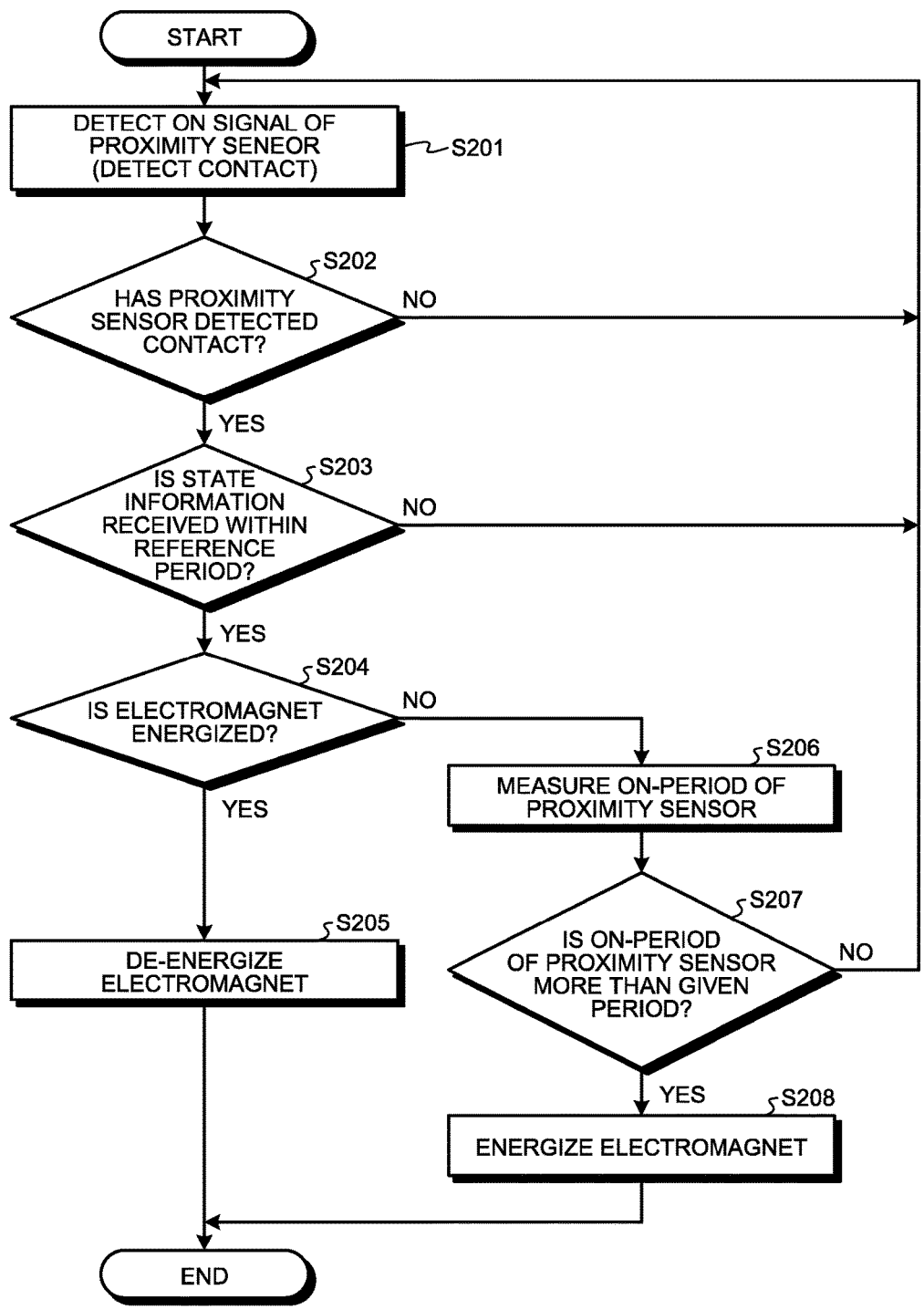

DISPLAY SYSTEM

CROSS-REFERENCE TO RELATED APPLICATIONS

The present application claims priority under 35 U.S.C. § 119 to Japanese Patent Application No. 2017-051946, filed on Mar. 16, 2017. The contents of which are incorporated herein by reference in their entirety.

BACKGROUND OF THE INVENTION

1. Field of the Invention

The present invention relates to a display system.

2. Description of the Related Art

Display products what is called "electronic information boards" that include a large size display such as a liquid crystal display or a plasma display or a projection screen ranging from 40 to 80 inches and a touch panel installed thereon have been available in the market for years. Such a product enables a dedicated pen linked to the display to provide operations to the touch panel.

Such a display-dedicated pen is disposed and retained on, for example, a tray located at the back of the display. Japanese Unexamined Patent Application Publication No. 2003-058312 discloses a mechanism of retracting and ejecting an input pen including a magnetic element. The mechanism retracts or ejects the input pen by controlling magnetic force of a magnetic element included in a device (a pen housing).

However, according to such a conventional technique, it is difficult to achieve retention of the dedicated pen linked to the display in a versatile manner. Specifically, a structure for retaining a dedicated pen on a tray located at the back of the display or in a pen housing cannot be easily used for a display embedded in, for example, a wall.

SUMMARY OF THE INVENTION

According to one aspect of the present invention, a display system includes a pointing device and a display device. The pointing device includes a magnetic member, a contact detector, a motion detector, a state determining unit, and a transmitter. The contact detector is configured to detect contact with a user. The motion detector is configured to detect a motion of the pointing device. The state determining unit is configured to determine whether contact detection information indicating detection of the contact is acquired from the contact detector, and determine whether a value indicating the motion acquired from the motion detector is less than a reference value. The transmitter is configured to transmit state information to the display device, the state information indicating a state of the pointing device, in response to the state determining unit determining that the contact detection information is acquired and the value indicating the motion is less than the reference value. The display device includes an electromagnet, a status determining unit, a receiver, and an electromagnet controller. The electromagnet is disposed at a predetermined location. The status determining unit is configured to determine an energization status of the electromagnet. The receiver is configured to receive the state information transmitted from the pointing device. The electromagnet controller is configured to control energization to the electromagnet in accordance with the energization status of the electromagnet when the state information is received. Attractive force is exerted between the electromagnet energized and generating magnetic force, and the magnetic member of the pointing device kept stationary at the predetermined location. Attractive force is eliminated between the electromagnet de-energized and losing magnetic force, and the magnetic member of the pointing device to be separated from the predetermined location.

BRIEF DESCRIPTION OF THE DRAWINGS

FIG. 3 is a flowchart illustrating an example procedure of state information transmission processing of the electronic pen according to the embodiment; and FIG. 4 is a flowchart illustrating an example procedure of energization control processing of the display according to the embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENT

Figure 1:
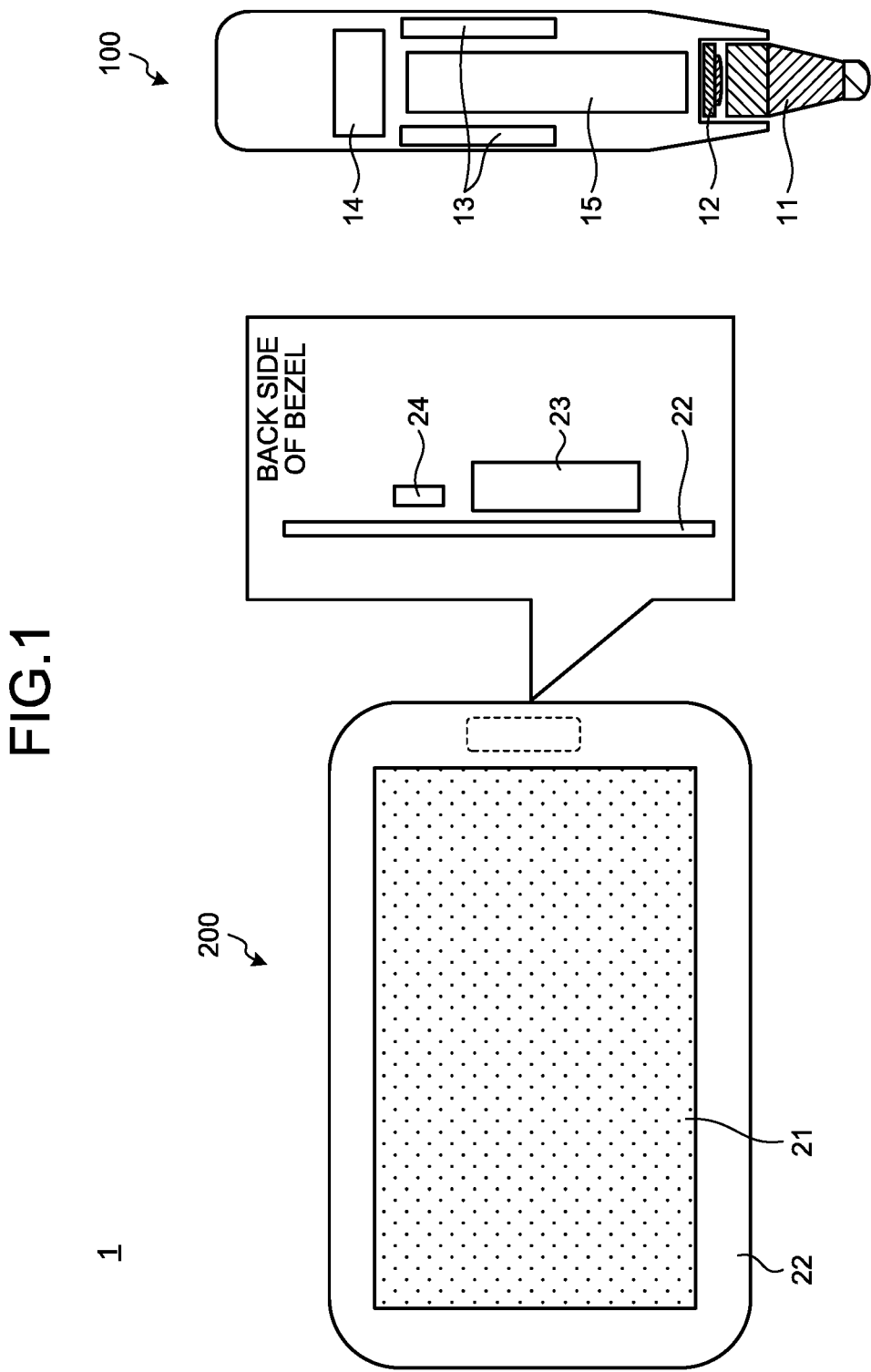
FIG. 1 is a diagram illustrating an example hardware configuration of a display system according to an embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to enable retention of a dedicated pen linked to a display in a versatile manner.

The following describes an embodiment of a display system according to the present invention with reference to the accompanying drawings. The embodiment described below is not intended to limit the scope of the present invention.

EMBODIMENT

A hardware configuration of a display system 1 according to the embodiment will be described with reference to FIG. 1. FIG. 1 is a diagram illustrating an example hardware configuration of the display system 1 according to the embodiment.

As illustrated in FIG. 1, the display system 1 includes an electronic pen 100 and a display 200. The display 200 can display a display image provided by a device such as a personal computer (PC), a tablet, a digital video camera, or a digital camera connected via, for example, a cable. The display 200 is a display device that can display a drawing made by a user. The display 200 may be referred to as an "electronic information board".

The display 200 includes a display screen 21 and a bezel 22 that is a frame of the display screen 21. The display 200 includes an electromagnet 23 and a proximity sensor 24 at the back of a predetermined location (e.g., an area defined by dashed line in FIG. 1) of the bezel 22. The electromagnet 23 and the proximity sensor 24 may be disposed at any location of the bezel 22, and are not necessarily disposed at the location illustrated in FIG. 1.

The electronic pen 100 is a dedicated pen (pointing device) linked to the display 200. The user can operate the display screen 21 or draw something on the display screen 21 by using the electronic pen 100. The electronic pen 100 includes a movable pen tip 11, a pen-tip switch 12, a contact detection sensor 13, an accelerometer 14, and a signal processing circuit 15. The electronic pen 100 includes a magnetic member (magnetic member M to be described later).

After or before using the electronic pen 100, the user attaches the electronic pen 100 to the predetermined location (defined by dashed line) of the bezel 22 or detaches the attached electronic pen 100 from the predetermined location of the bezel 22. In the display system 1 as described later, when the user performs a gesture to attach the electronic pen 100 to the predetermined location, attractive force is exerted between the magnetic member M of the electronic pen 100 and the electromagnet 23 of the display 200. In the display system 1 as described later, when the user performs a gesture to detach the attached electronic pen 100 from the predetermined location, the attractive force between the magnetic member M of the electronic pen 100 and the electromagnet 23 of the display 200 is lost.

The proximity sensor 24 detects proximity of the electronic pen 100. For example, when the user stops using the electronic pen 100, the user performs a gesture to attach the electronic pen 100 to the predetermined location (defined by dashed line) of the bezel 22. The gesture to attach the electronic pen 100 refers to such a movement that the user brings the electronic pen 100 closer to the predetermined location and keeps it stationary. With this gesture, the proximity sensor 24 detects proximity of the electronic pen 100. The proximity sensor corresponds to a "proximity detector".

The electromagnet 23, when energized, generates magnetic force. The electromagnet 23 is energized or de-energized when the following conditions are satisfied. One condition is that the proximity sensor 24 detects proximity of the electronic pen 100. Another condition is that the display 200 receives state information from the electronic pen 100. Details of the state information will be described later.

The movable pen tip 11 is a movable member that moves upon contact with an object. When an end of the movable pen tip 11 contacts the display screen 21, the movable pen tip 11 moves in the longitudinal direction of the electronic pen 100, and the other end thereof contacts the pen-tip switch 12. An elastic member is provided between the movable pen tip 11 and the pen-tip switch 12. When the movable pen tip 11 is detached from the display screen 21, the elastic force of the elastic member brings the movable pen tip 11 to its original position. The pen-tip switch 12 is switched on and off depending on whether the movable pen tip 11 is in contact with an object. An on signal or off signal corresponding to a switching state of the pen-tip switch 12 is delivered to the signal processing circuit 15.

The contact detection sensor 13 detects contact with the user on the electronic pen 100. For example, when the user touches the electronic pen 100 or while the user is holding the electronic pen 100, the contact detection sensor 13 outputs contact detection information indicating detection of contact with the user to the signal processing circuit 15. The contact detection sensor 13 corresponds to a "contact detector".

The accelerometer 14 detects a motion (acceleration) of the electronic pen 100. The accelerometer 14, for example, constantly detects the acceleration of the electronic pen 100 and outputs acceleration detection information to the signal processing circuit 15. The accelerometer 14 corresponds to a "motion detector".

The signal processing circuit 15 controls transmission of signals to the display 200 in accordance with a state of the electronic pen 100. For example, the signal processing circuit 15 transmits the on signal or off signal corresponding to a switching state of the pen-tip switch 12 to the display 200. The signal processing circuit 15 determines whether the contact detection information is acquired from the contact detection sensor 13, and determines whether the acceleration detection information acquired from the accelerometer 14 is less than a reference value. When the contact detection information is acquired and the acceleration detection information is less than the reference value, the signal processing circuit 15 transmits the state information indicating the state of the electronic pen 100 to the display 200.

The contact detection information can be acquired when the user is operating the display screen 21 with the electronic pen 100, or when the user touches the electronic pen 100 to hold it. When the acceleration detection information is less than the reference value, the information indicates that the electronic pen 100 is stationary or nearly stationary. In other words, when the user is touching the electronic pen 100 but does not move the electronic pen 100, the contact detection information is acquired and the acceleration detection information is less than the reference value. In the present embodiment, such a situation may occur when the user is attaching the electronic pen 100 to the predetermined location (defined by dashed line) of the bezel 22 or when the user is detaching the attached electronic pen 100 from the predetermined location of the bezel 22.

The display 200 that has received the state information from the electronic pen 100, controls energization to the electromagnet 23 in accordance with an energization status of the electromagnet 23. For example, when the proximity sensor 24 detects proximity of the electronic pen 100 and the display 200 receives the state information from the electronic pen 100 while the electromagnet 23 is not being energized, the display 200 controls start of energization to the electromagnet 23. When the proximity sensor 24 detects proximity of the electronic pen 100 and the display 200 receives the state information from the electronic pen 100 while the electromagnet 23 is being energized, the display 200 controls stop of energization to the electromagnet 23.

When the electromagnet 23 is energized and generates magnetic force and the magnetic member M of the electronic pen 100 is kept stationary at the predetermined location, attractive force is exerted therebetween and thus the user can attach the electronic pen 100 to the predetermined location. When the electromagnet 23 is de-energized and loses magnetic force and the magnetic member M of the electronic pen 100 is separated from the predetermined location, the attractive force therebetween is lost and thus the user can detach the attached electronic pen 100 from the predetermined location.

Figure 2:
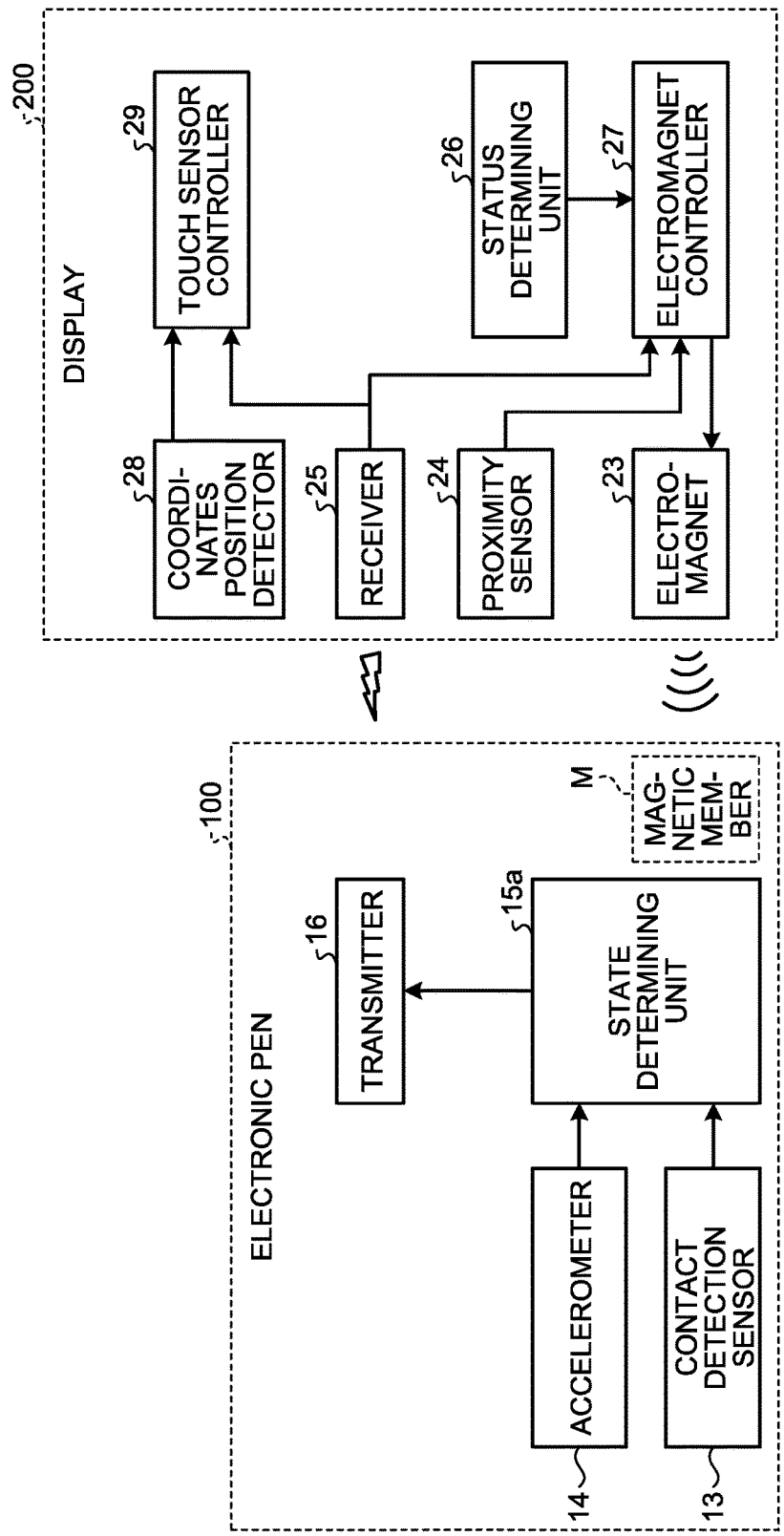
FIG. 2 is a block diagram illustrating functional configurations of an electronic pen and a display according to the embodiment.

Described next are functional configurations of the electronic pen 100 and the display 200 according to the embodiment with reference to FIG. 2. FIG. 2 is a block diagram illustrating the functional configurations of the electronic pen 100 and the display 200 according to the embodiment.

As illustrated in FIG. 2, the electronic pen 100 includes the contact detection sensor 13, the accelerometer 14, a state determining unit 15a, a transmitter 16, and the magnetic member M. The state determining unit 15a is one of the functions executed by the signal processing circuit 15 described above.

The contact detection sensor 13 detects contact with the user. More specifically, the contact detection sensor 13 outputs contact detection information indicating detection of contact with the user to the state determining unit 15a when the user touches the electronic pen 100 or while the user is holding the electronic pen 100.

The accelerometer 14 detects motion (acceleration) of the electronic pen 100. More specifically, the accelerometer 14 constantly detects the acceleration of the electronic pen 100 and outputs the acceleration detection information to the state determining unit 15a.

The state determining unit 15a determines whether the contact detection information is acquired and whether the acceleration detection information is less than the reference value. More specifically, the state determining unit 15a determines whether the contact detection information is acquired from the contact detection sensor 13, and determines whether the acceleration detection information acquired from the accelerometer 14 is less than the reference value. The reference value indicates, for example, that the acceleration is nearly zero. In other words, when the user is in contact with the electronic pen 100 but barely moves the electronic pen 100, the contact detection information is acquired and the acceleration detection information is less than the reference value. When the state determining unit 15a determines that the contact detection information is acquired and the acceleration detection information is less than the reference value, the state determining unit 15a requests the transmitter 16 to transmit the state information to the display 200.

When the state determining unit 15a determines that the contact detection information is acquired and the acceleration detection information is less than the reference value, the transmitter 16 transmits the state information indicating the state of the electronic pen 100 to the display 200. More specifically, the transmitter 16 transmits the state information to the display 200 upon reception of a transmission request for the state information from the state determining unit 15a.

The electronic pen 100 further includes a function of transmitting the on signal or off signal corresponding to a switching state of the pen-tip switch 12 to the display 200. In the present embodiment, the operation and the drawing on the display screen 21 by the user with the electronic pen 100 may be processed by using known technologies, and thus further explanation will not be described.

As illustrated in FIG. 2, the display 200 includes the electromagnet 23, the proximity sensor 24, a receiver 25, a status determining unit 26, an electromagnet controller 27, a coordinates position detector 28, and a touch sensor controller 29.

The proximity sensor 24 detects proximity of the electronic pen 100. More specifically, the proximity sensor 24 detects proximity of the electronic pen 100 when the user brings the electronic pen 100 closer to the predetermined location. The user brings the electronic pen 100 closer to the predetermined location to, for example, attach the electronic pen 100 thereto. In this case, the proximity sensor 24 detects proximity of the electronic pen 100. The proximity sensor 24 also detects proximity of the electronic pen 100 while the electronic pen 100 is being attached to the predetermined location, that is, while attractive force is exerted between the magnetic member M and the electromagnet 23.

The receiver 25 receives various types of information from the electronic pen 100. More specifically, the receiver 25 receives the state information transmitted from the electronic pen 100. As described above, the state information is transmitted from the electronic pen 100 when contact with the user on the electronic pen 100 is detected and when the acceleration detection information of the electronic pen 100 is less than the reference value. In this regard, reception of the state information by the receiver 25 means that the user is touching the electronic pen 100 located at the predetermined location, trying to attach the electronic pen 100 or detach the attached electronic pen 100. The receiver 25 also receives the on signal or off signal corresponding to a switching state of the pen-tip switch 12 transmitted from the electronic pen 100.

The status determining unit 26 determines the energization status of the electromagnet 23. More specifically, the status determining unit 26 determines whether the electromagnet 23 is being energized. The energization status determined by the status determining unit 26 will be used as appropriate as described below.

The electromagnet controller 27 controls energization to the electromagnet 23 in accordance with an energization status of the electromagnet 23. More specifically, when the receiver 25 receives the state information and the status determining unit 26 determines that the electromagnet 23 is not being energized, and when the proximity sensor 24 detects proximity of the electronic pen 100, the electromagnet controller 27 controls start of energization to the electromagnet 23.

When the electromagnet 23 is not being energized, the electromagnet controller 27 may determine whether the proximity sensor 24 detects proximity of the electronic pen 100 for a given period or longer (e.g., three seconds). For example, when the proximity sensor 24 detects proximity of the electronic pen 100 for a given period or longer, the electromagnet controller 27 controls start of energization to the electromagnet 23. In other words, when the user keeps the electronic pen 100 stationary for a given period or longer near the predetermined location to attach the electronic pen 100 thereto, the electromagnet controller 27 controls start of energization to the electromagnet 23. With this configuration, attractive force is exerted between the electromagnet 23 that is energized and thus generates magnetic force and the magnetic member M of the electronic pen 100 that is kept stationary at the predetermined location, and the user can attach the electronic pen 100 to the predetermined location.

When the receiver 25 receives the state information while the status determining unit 26 determines that the electromagnet 23 is being energized, and when the proximity sensor 24 detects proximity of the electronic pen 100, the electromagnet controller 27 controls stop of energization to the electromagnet 23. In other words, when the user touches the electronic pen 100 attached to the predetermined location trying to detach it therefrom, the electromagnet controller 27 controls stop of energization to the electromagnet 23. With this configuration, attractive force is not exerted between the electromagnet 23 that is de-energized and thus loses magnetic force and the magnetic member M of the electronic pen 100 being separated from the predetermined location, and the electronic pen 100 is detached from the predetermined location.

The coordinates position detector 28 detects a pointing position (coordinates position) of the electronic pen 100 on the display screen 21. The touch sensor controller 29 controls the display screen 21 configured as a touch sensor to process operation and drawing made by the user on the display screen 21 based on the coordinates position detected by the coordinates position detector 28. The touch sensor controller 29 controls the display screen 21 based on the on signal or off signal corresponding to a switching state of the pen-tip switch 12 received by the receiver 25. For example, the touch sensor controller 29 controls the display screen 21 while the on signal is being received. As described above, processing performed by the coordinates position detector 28 and the touch sensor controller 29 can be implemented by known technologies.

Described next is the procedure of state information transmission processing of the electronic pen 100 according to the embodiment with reference to FIG. 3. FIG. 3 is a flowchart illustrating an example procedure of the state information transmission processing of the electronic pen 100 according to the embodiment.

As illustrated in FIG. 3, the electronic pen 100 determines whether the contact detection information is acquired from the contact detection sensor 13 (Step S101). If the contact detection information is acquired (Yes at Step S101), the electronic pen 100 performs the processing at Step S102. If the contact detection information is not acquired (No at Step S101), the electronic pen 100 performs the processing at Step S101 again.

The electronic pen 100 determines whether the acceleration detection information acquired from the accelerometer 14 is less than the reference value (Step S102). If the acceleration detection information is less than the reference value (Yes at Step S102), the electronic pen 100 transmits state information to the display 200 (Step S103). If the acceleration detection information is equal to or greater than the reference value (No at Step S102), the electronic pen 100 performs the processing at Step S101 again.

Described next is the procedure of energization control processing of the display 200 according to the embodiment with reference to FIG. 4. FIG. 4 is a flowchart illustrating an example procedure of the energization control processing of the display 200 according to the embodiment.

As illustrated in FIG. 4, the display 200 detects proximity of the electronic pen 100 by using the proximity sensor 24 (Step S201). If proximity of the electronic pen 100 is detected by the proximity sensor 24 (Yes at Step S202), the display 200 determines whether it has received the state information from the electronic pen 100 (Step S203). The display 200 may determine whether it receives the state information within a reference period after the proximity sensor 24 detects proximity of the electronic pen 100. If proximity of the electronic pen 100 has not been detected by the proximity sensor 24 (No at Step S202), the display 200 performs the processing at Step S101 again.

If the display 200 receives the state information (Yes at Step S203), the display 200 determines whether the electromagnet 23 is being energized (Step S204). If the display 200 has received no state information (No at Step S203), the display 200 performs the processing at Step S201 again. If the electromagnet 23 is being energized (Yes at Step S204), the display 200 controls stop of energization to the electromagnet 23 (Step S205).

If the electromagnet 23 is not being energized (No at Step S204), the display 200 measures a detection period in the proximity sensor 24 (Step S206), and determines whether proximity has been detected for a given period or longer (Step S207). If proximity has been detected for a given period or longer (Yes at Step S207), the display 200 controls start of energization to the electromagnet 23 (Step S208). If proximity has not been detected for a given period or longer (No at Step S207), the display 200 performs the processing at Step S201 again.

As described above, when contact with the user is detected and the acceleration of the electronic pen 100 is less than a reference value, the electronic pen 100 transmits the state information indicating the state of the electronic pen 100 to the display 200. When the display 200 receives the state information and proximity of the electronic pen 100 is detected for a given period or longer while the electromagnet 23 is not being energized, the display 200 controls start of energization to the electromagnet 23. When the display 200 receives the state information and proximity of the electronic pen 100 is detected while the electromagnet 23 is being energized, the display 200 controls stop of energization to the electromagnet 23. With this configuration, the display system 1 enables retention of a dedicated pen (electronic pen 100) linked to the display 200 in a versatile manner. Specifically, this configuration eliminates the need for a housing for accommodating the electronic pen 100. If the display 200 is embedded in, for example, a wall, the display 200 can retain the electronic pen 100 without being aesthetically unattractive.

The processing procedures, the control procedures, the specific names, information including various types of data and parameters disclosed in the description and the drawings given above can be altered in any desired manner unless otherwise specified. The illustrated components of the devices represent functions, thus conceptual, and need not be physically configured as illustrated. In other words, the specific modes of distribution and integration of the devices are not limited to those illustrated, and all or a part thereof can be functionally or physically distributed or integrated in any desired units according to various kinds of load and conditions of use.

An embodiment enables retention of a dedicated pen linked to a display in a versatile manner.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A display system comprising:
   a pointing device; and
   a display device,
   the pointing device including:
      a magnetic member;
      a contact detector configured to detect contact with a user;
      a motion detector configured to detect a motion of the pointing device;
      a state determining unit configured to determine whether contact detection information indicating detection of the contact is acquired from the contact detector, and determine whether a value indicating the motion acquired from the motion detector is less than a reference value; and
      a transmitter configured to transmit state information to the display device, the state information indicating a state of the pointing device, in response to the state determining unit determining that the contact detection information is acquired and the value indicating the motion is less than the reference value,
   the display device including:
      an electromagnet disposed at a predetermined location;
      a status determining unit configured to determine an energization status of the electromagnet;
      a receiver configured to receive the state information transmitted from the pointing device; and
      an electromagnet controller configured to control energization to the electromagnet in accordance with the energization status of the electromagnet when the state information is received, wherein
   attractive force is exerted between the electromagnet energized and generating magnetic force, and the magnetic member of the pointing device kept stationary at the predetermined location, and
   attractive force is eliminated between the electromagnet de-energized and losing magnetic force, and the magnetic member of the pointing device to be separated from the predetermined location.

2. The display system according to claim 1, wherein the display device further includes a proximity detector that detects proximity of the pointing device,
   the proximity detector is disposed at the predetermined location, and
   the electromagnet controller is configured to control energization to the electromagnet, in response to the proximity being detected.

3. The display system according to claim 2, wherein the electromagnet controller is configured to control start of energization to the electromagnet, in response to proximity of the pointing device being detected for a given period or longer when the electromagnet is not being energized.

4. The display system according to claim 1, wherein the electromagnet controller is configured to control start of energization to the electromagnet when the electromagnet is not being energized.

5. The display system according to claim 1, wherein the electromagnet controller is configured to control stop of energization to the electromagnet when the electromagnet is being energized.

6. The display system according to claim 1, wherein the predetermined location is included in a frame surrounding a display screen of the display device.

* * * * *